United States Patent
Rhee et al.

(10) Patent No.: US 9,471,461 B2
(45) Date of Patent: Oct. 18, 2016

(54) GUARDING A MONITORING SCOPE AND INTERPRETING PARTIAL CONTROL FLOW CONTEXT

(71) Applicant: NEC Laboratories America, Inc., Princeton, NJ (US)

(72) Inventors: Jungwhan Rhee, Princeton, NJ (US); Hui Zhang, Princeton Junction, NJ (US); Nipun Arora, Plainsboro, NJ (US); Guofei Jiang, Princeton, NJ (US); Qiang Zeng, State College, PA (US)

(73) Assignee: NEC Corporation (JP)

( * ) Notice: Subject to any disclaimer, the term of this patent is extended or adjusted under 35 U.S.C. 154(b) by 11 days.

(21) Appl. No.: 14/227,481

(22) Filed: Mar. 27, 2014

(65) Prior Publication Data

US 2014/0298300 A1   Oct. 2, 2014

Related U.S. Application Data

(60) Provisional application No. 61/805,809, filed on Mar. 27, 2013.

(51) Int. Cl.
*G06F 9/44* (2006.01)
*G06F 11/34* (2006.01)

(52) U.S. Cl.
CPC ..... *G06F 11/3466* (2013.01); *G06F 2201/865* (2013.01)

(58) Field of Classification Search
None
See application file for complete search history.

(56) References Cited

U.S. PATENT DOCUMENTS 6,343,375 B1 * 1/2002 Gupta ............... G06F 9/44589
                                                 717/152
8,566,798 B2 * 10/2013 Derdak et al. ............. 717/128

* cited by examiner

*Primary Examiner* — Qamrun Nahar
(74) *Attorney, Agent, or Firm* — Joseph Kolodka

(57) ABSTRACT

A computer implemented method for maintaining a program's calling context correct even when a monitoring of the program goes out of a scope of a program analysis by validating function call transitions and recovering partial paths before and after the violation of the program's control flow. The method includes detecting a violation of control flow invariants in the software system including validating a source and destination of a function call in the software system, interpreting a pre-violation partial path responsive to a failure of the validating, and interpreting a post violation path after a violation of program flow.

20 Claims, 4 Drawing Sheets

① Recovery of A pre-violation partial path
② Detection of the control flow invariant violation
③ Recovery of A post-violation partial path IN-scope and out-of-scope program execution ① Recovery of A pre-violation partial path ② Detection of the control flow invariant violation ③ Recovery of A post-violation partial path IN-scope and out-of-scope program execution Caller side:

```
Caller_funct() {
    ...
    tls.cs = caller_func.cs1;
    tls.callee = callee_ID;
    tls.lastID = ID;
    Function call;
    ...
}
```

(A) CALLER instrumentation

Callee side:

```
Callee_func() {
    bool violation = false;
    if (tls.callee != callee_ID) {
        violation = true;          Code for recovery
        push tls.cs;               Of a pre-violation path
        push tls.lastID;
        push Caller_func;          Code for recovery
        tls.ID = 0;                Of a post-violation path
    }
    ...
    if (violation == true) {
        pop Caller_func, lastID, and cs;
    }
}
```

(B) CALLEE instrumentation

Fig. 3

GUARDING A MONITORING SCOPE AND INTERPRETING PARTIAL CONTROL FLOW CONTEXT

RELATED APPLICATION INFORMATION

This application claims priority to provisional application No. 61/805,809 filed Mar. 27, 2013, the contents thereof are incorporated herein by reference

BACKGROUND OF THE INVENTION

The present invention relates generally to software system performance diagnosis, and more particularly, to Method for Guarding a Monitoring Scope and Interpreting Partial Control Flow Context.

Debugging enterprise software is challenging due to growing complexity of programs and dependency among software components. Modern software often involves third-part components to compose the entire software package at the deployment. Also modern object-oriented programs use dynamic techniques for loading software packages such as dynamic class loading in Java. In such situations program analysis of software may not have the entire information regarding its execution. Such incompleteness of the analyzed program scope can introduce inaccuracy in the monitoring of application status.

In order to monitor application execution status efficiently, several approaches called call context encoding [1,2] were proposed. [1] Michael D. Bond and Kathryn S. McKinley. 2007. Probabilistic calling context. In Proceedings of the 22nd annual ACM SIGPLAN conference on Object-oriented programming systems and applications (OOPSLA '07, and [2] William N. Sumner, Yunhui Zheng, Dasarath Weeratunge, and Xiangyu Zhang. 2010. Precise calling context encoding. In Proceedings of the 32nd ACM/IEEE International Conference on Software Engineering—Volume 1 (ICSE '10), Vol. 1. ACM, New York, N.Y., USA.

[1] and [2] are prior arts that provide the monitoring of concise application status via calling context encoding. The methodology of [1] does not guarantee to provide deterministic and accurate encoding information. [2]'s approach is limited for object oriented programs because its encoding algorithm cannot handle dynamic dispatch and an incomplete control flow graph. When the program execution interleaves the code inside and outside of the program analysis, encoding value could be manipulated. This invention provides a new method to handle the execution of such unexpected code flow and provide deterministic and accurate encoding values.

[1] provides a simple scheme that encodes the executed code probabilistically using hash. This solution does not require program analysis. Instead, it blindly instruments any application code and generates hash values of the executed code. The corresponding downside of this simplicity is that the encoded value may not be easily and accurately decoded. Due to the usage of hash values, the decoding process is not deterministic and can fail in some cases due to the collision of encoded values.

[2] uses static analysis to precisely encode and decode application call context. The strength of this approach is that the encoded values can be deterministically and efficiently decoded based on program analysis. However, this approach does not work for object-oriented (OO) programs. Complexity and multiple components of OO-software make the static program analysis challenging and expensive. Any missing component due to cost of analysis or lack of accuracy leads to unexpected program control flow which can introduce inaccuracy of the encoded application status.

Another known approach has been proposed by [3] Martín Abadi, Mihai Budiu, Úlfar Erlingsson, and Jay Ligatti. 2009. Control-flow integrity principles, implementations, and applications. *ACM Trans. Inf. Syst. Secur.* 13, 1, Article 4 (November 2009), 40 pages. DOI=10.1145/1609956.1609960.

[3] proposes a security mechanism for detecting illegal code execution. We use a similar technique as one building block in a very different problem domain to track the transition between the in-scope (analyzed by program analysis) and out-of-scope (which is outside of program analysis) functions. Given the complexity of object oriented software, this scheme deals with incompleteness of program analysis. More importantly our scheme introduces the actions to recover a pre-violation call path and a post-violation call path after the detection of a violation. Such details are unique in our problem domain and it addresses the real challenge to cope with the execution of unexpected control flow.

Accordingly, there is a need for a solution for guarding a monitoring scope and interpreting partial control flow context that is not taught heretobefore.

BRIEF SUMMARY OF THE INVENTION

The invention is directed to a computer implemented method that includes maintaining, in a software system, a program's calling context correct even when a monitoring of the program goes out of a scope of a program analysis by validating function call transitions and recovering partial paths before and after the violation of the program's control flow. The maintaining aspect includes detecting a violation of control flow invariants in the software system including validating a source and destination of a function call in the software system, interpreting a pre-violation partial path responsive to a failure of the validating, and interpreting a post violation path after a violation of program flow.

In a similar aspect of the invention there is provided a system for maintaining, in a software system, a program's calling context correct even when a monitoring of the program goes out of a scope of a program analysis by validating function call transitions and recovering partial paths before and after the violation of the program's control flow. The maintaining aspect includes detecting a violation of control flow invariants in the software system including validating a source and destination of a function call in the software system, interpreting a pre-violation partial path responsive to a failure of the validating, and interpreting a post violation path after a violation of program flow.

These and other advantages of the invention will be apparent to those of ordinary skill in the art by reference to the following detailed description and the accompanying drawings.

BRIEF DESCRIPTION OF THE DRAWINGS

FIG. 3 shows instrumented code mechanism at the caller and callee, in accordance with the invention.

DETAILED DESCRIPTION

The present invention is directed a method to monitor and address the inconsistency between runtime program status and the program analysis result. Even though the analysis result does not fully cover the program's behavior, this proposed scheme detects the incident that the program status diverges from its analysis result at runtime and performs a remedy mechanism to recover and maintain accurate program status. This proposal is composed of three mechanisms as follows.

The invention detects the moment when the program executes in a different way from the program analysis. During the program analysis, this technique determines the source and destination of each function call. This pair of information is validated at runtime by inserting (instrumenting) code into a program. This code detects the moment by validating whether each function call complies the pair information from program analysis.

When this validation fails, it is important to store the program status to recover the last valid program call path before the violation. Specifically, on the detection of a violation, the last program status and the source of the call are stored.

The call path after a violation of program flow is an unexpected flow in the program analysis; therefore, it is hard to be deterministically decoded. We propose a mechanism to record and decode the program status after violation by introducing a virtual context. In particular, we reset the encoding ID of program context as 0 when a violation occurs. The following call path can be correctly decoded using the original decoding algorithm because it complies the properties of the original encoding scheme.

In summary, this invention maintains the program's calling context correct even when the monitored program goes out of the scope of program analysis by validating function call transitions and recovering partial paths before and after the violation of program's control flow.

Figure 1:
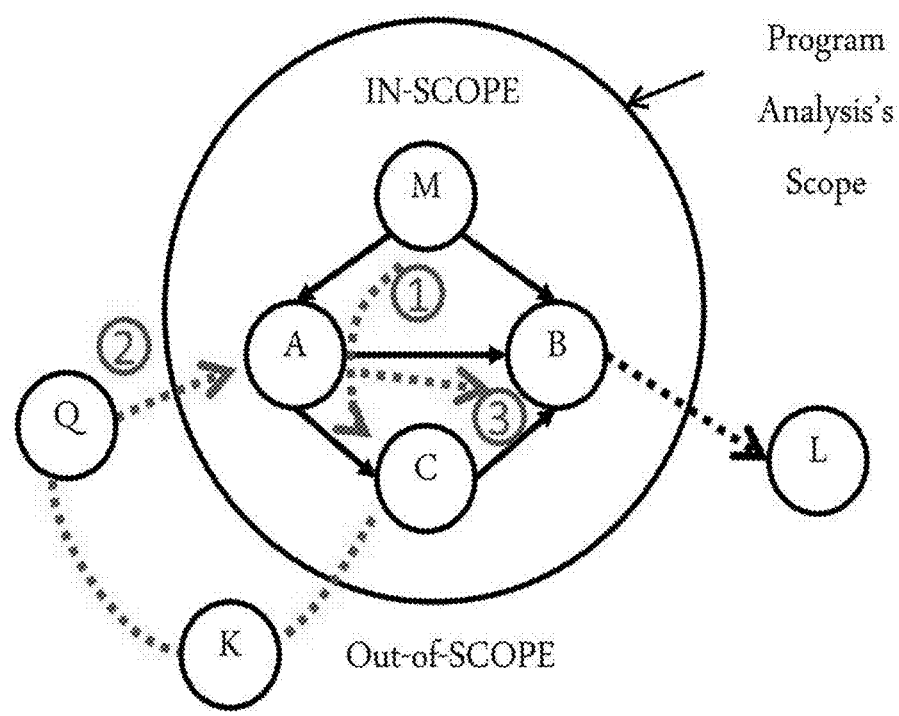
FIG. 1 is an diagram depicting an example of an inter-procedural control flow violation: a function call path interleaving the program scope and out of the scope (①→②→③), with the inventive aspect detecting this violation (②) and interpreting partial program paths (①, ③).

FIG. 1 illustrates the invention by way of an example of an interprocedural control flow violation: a function call path interleaving the program scope and out-of-the scope (①→②→③). This invention detects this violation (②) and interpretes partial program paths (①, ③). Given a program binary, a program analysis result is shown as the graph within a circle. A, B, C, and M represent the functions of this program and the edges among them show how function calls can be made as this program executes.

There are other functions and calls that are not discovered in the analysis. L, K, and Q are the example of such functions and we call the code area including them, the out of program scope. Low level LibC functions and system calls could be the examples of out-of-scope functions. They do not exist inside the program binary, but they are involved in the execution of the program.

In many programs written in imperative languages like C, the out-of-scope may not necessarily affect the accuracy of calling context of the program. If the calls to low level functions do not further call the application code back, the edges among in-scope functions can remain valid. For example, in FIG. 1, if a function call from B to L simply returns, there is no effect on the context among A, B, C, and M.

Object oriented programs, however, often have program control flow that doesn't follow this pattern. For example, FIG. 1 shows a function call sequence M-A-C-K-Q-A-B. When this call pattern happens, the monitor will observe the pattern M-A-C-A-B without K and Q because K and Q are not monitored at all. The problem is that C-A sequence was never considered in the program analysis. And when this behavior happens, there will be function call transition from C to A and the encoding value based on the analysis becomes invalid.

In order to ensure the correctness of call context encoding, this invention presents a method to detect this unexpected control flow. In addition, when it happens, it causes two partial call paths M-A-C (shown as ①) and C-A-B (shown as ②) before and after this instance. We also propose the mechanisms to recover these two partial paths.

Figure 2:
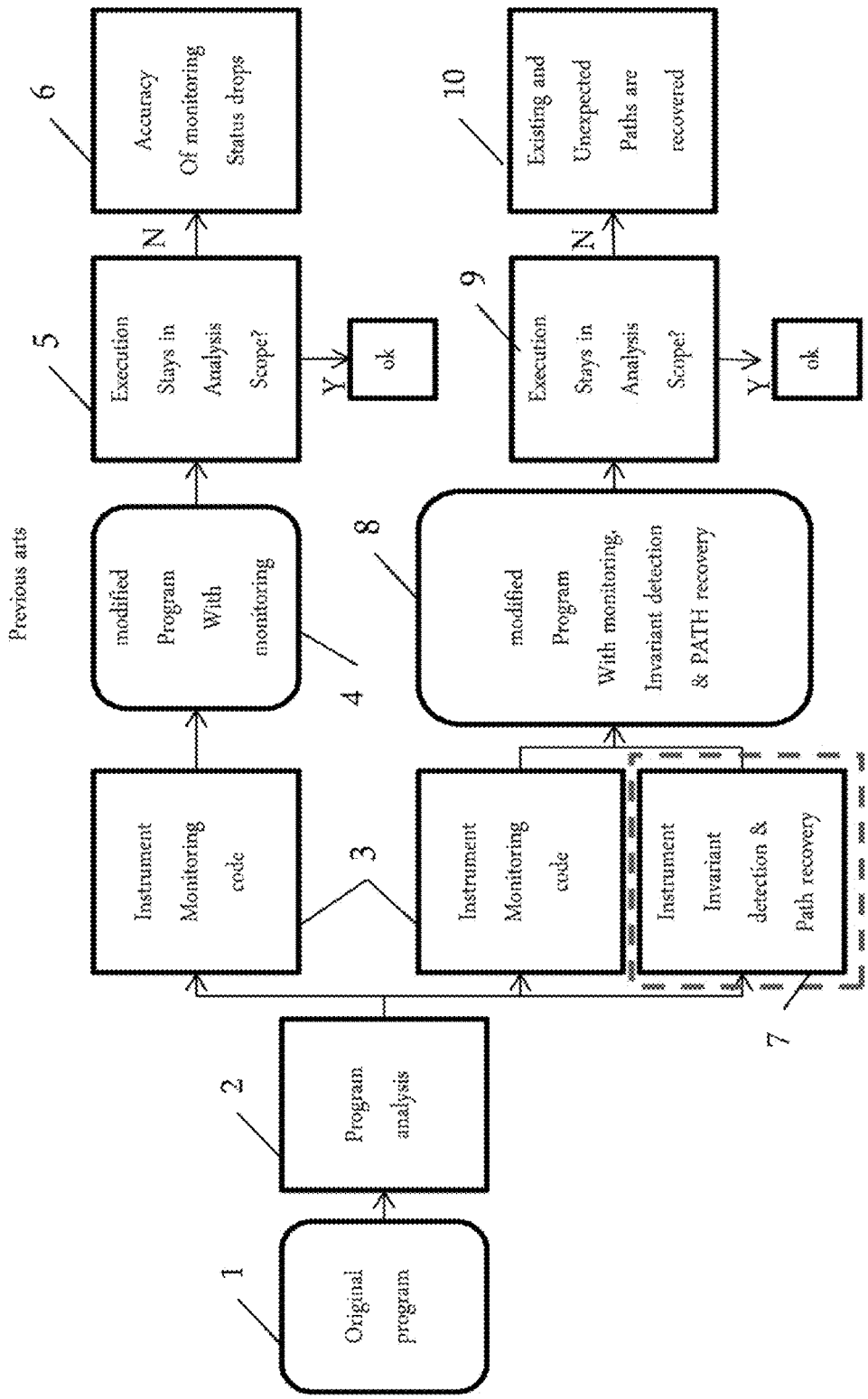
FIG. 2 is a functional diagram depicting the inventive aspect, instrument invariant detection and path recover 7.

FIG. 2 shows the functional diagram of prior arts and this proposed invention. The input is a program (shown as 1). After its structure is analyzed in the program analysis process (block 2), the monitoring code is inserted into the program (block 3). This program may execute code which was not included in the analysis but calls the analyzed code. If it happens (block 5), the accuracy of the monitored program status may drop (block 6).

The proposed invention introduces additional code that is inserted into the program (block 7). The output program has include additional logic to detect the execution of unexpected code and recovery of call paths when it happens (shown as 8). When the code out of program analysis executes (block 9), the code in this invention detects the incident and recover partial paths before and after the incident (block 10).

The novelty of this invention is the block 7. The block 10 is its effect. In the following sections, we present three major functionalities of the inserted code in the block 7: 1. Detection of a violation of control variants, 2. Interpreting a pre-violation partial path, and 3. Interpreting a post-violation path.

1. Detection of a Violation of Control Flow Invariants

In order to detect an unexpected control flow, we use an idea similar to what has been explored in a different problem domain, computer security. Control flow integrity [3] prevents attacks that subvert program code execution by enforcing the control flow. This work assumes the program analysis could produce a control flow graph (CFG) and it prevents any exceptions violating this graph as the attack cases. This may be achieved in certain types of programs written in imperative languages as in [2]. However, in object oriented software which use dynamic features such as dynamic class loading and inheritance, the construction of a complete CFG itself is a very challenging goal.

We take this mechanism for a completely different purpose as a method for detecting the control flow transition between functions in the program analysis scope and out-of-scope functions.

In order to detect an unexpected program function calls, our scheme generates expected function call patterns. This result becomes the invariants of function calls (i.e., control flow integrity) which trigger an action on violation. The basic mechanism to validate a function call is that in the caller side an expected callee value is stored in a shared variable and this value is checked whether it matches the callee at its entry of the callee function.

Regarding the values of IDs for callees, it will be ideal that each callee can have a unique value. However, due to dynamic dispatches, one caller may have multiple callees. This is not uncommon particularly in OO software which heavily uses virtual functions due to inheritance and polymorphysm. Therefore, it is a real concern to be solved to make this solution feasible.

---
Algorithm 3 ID Assignment
---
1: function ASSIGNID(CG)
2:    for n ∈ N do
3:      Create a subset = n
4:    for each call site cs in CG do
5:      assume cs can be dispatched to $n_1, \ldots, n_k$
6:      merge subsets containing $n_1, \ldots, n_k$, respectively
7:    Assign a unique ID for each subset
8:    Assign the ID of each subset to its nodes.

---

In order to solve this challenge, we propose an algorithm shown in Algorithm 3. It automatically assigns the common ID for virtual functions The details on how this mechanism is implemented and specifically what code is inserted into the program to enforce the feature are presented in FIG. 3. As the detection of the violation is performed by matching information in the caller and its callee of a function call, we present the code inserted in respectively the caller (FIG. 3.A) and the callee (FIG. 3.B).

In the caller, the expected callee ID (callee_ID) is stored in a global variable, "tls.callee". Our method instruments code into the binary code without requiring source code and one challenge on implementation is to create a global and thread-safe variable which is not interfered by multiple threads and transparent to the program. As one way to do this, we use a thread local storage (TLS) and "tls" in the notation refers to this. In the callee, this expected callee ID is compared with the callee_ID of the current function, which is statically determined when this callee side instrumentation code is generated. If they are different, a violation of control flow invariant occurs and corresponding actions (to be presented next) will be taken.

Figure 4:
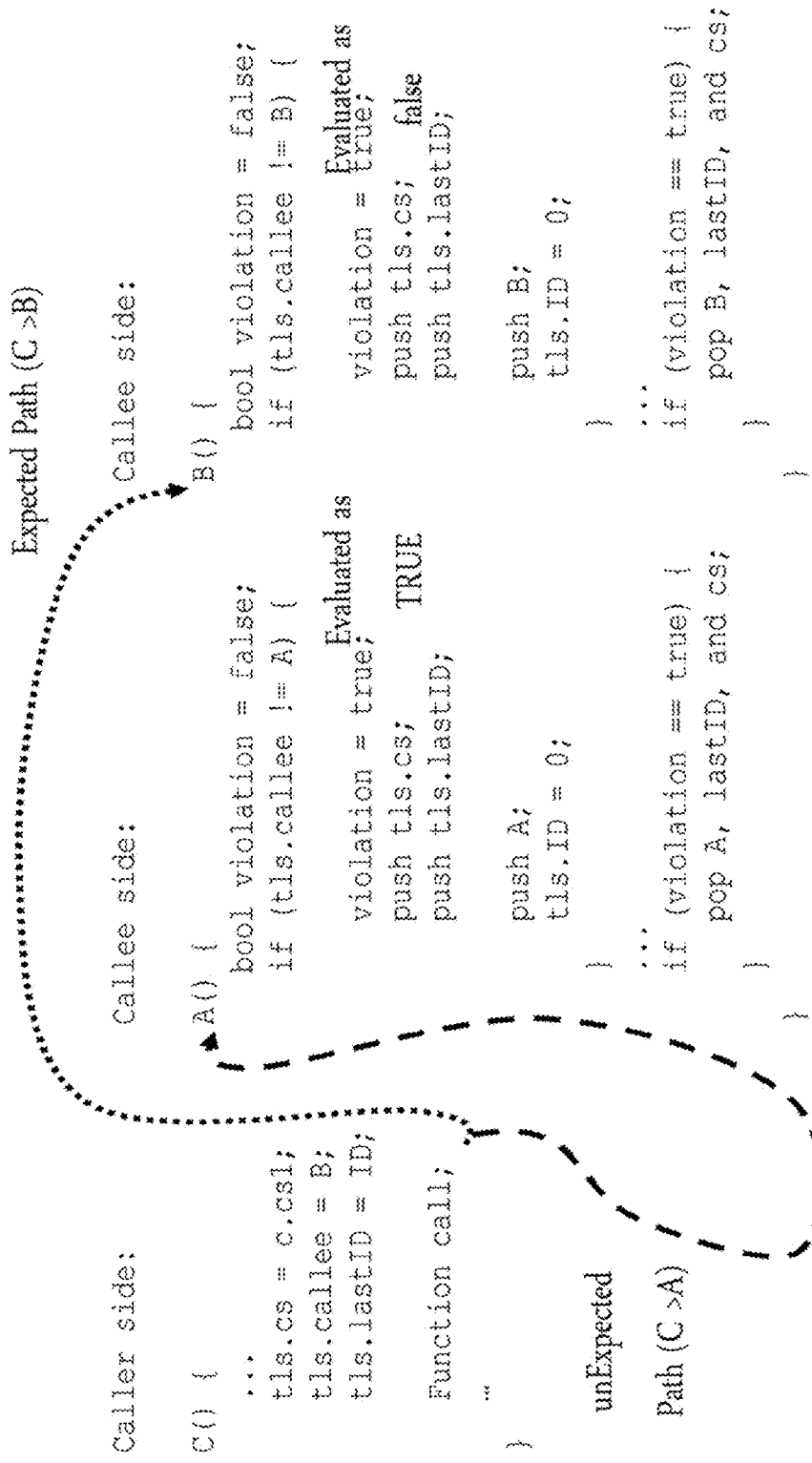
FIG. 4 is a shows and example of the detection of a flow control invariant, in accordance with the invention.

FIG. 4 illustrates a specific example based on the program code shown in FIG. 1. The caller function C sets the expected callee value "B". In the expected call path (C→B), this value will be matched with the callee's name "B". The if condition is evaluated as false and there is no action taken. However, in the unexpected path calling the function A indirectly via out-of-scope functions (C→A), the expected value ("B") will not match the callee function ("A"); therefore, it will trigger a violation. Specifically, it causes the "if (tls.callee !=A)" condition to be evaluated as true, and the action inside the condition is taken.

Next, we present what action is taken on the detection of a control flow violation.

2. Interpreting a Pre-Violation Partial Path

The motivation to determine this violation is to prevent the manipulation of call context ID (monitored program status) values from unexpected control flow. Specifically on the detection, it is desired to recover the valid partial call path up to the last function node before the violation and another call path after the violation. In this section, first we present how to recover the path before the violation.

As a program executes, in one call path of a program, potentially more than one control flow invariant violation can happen. In order to store all information necessary for recovery, we use a stack which is a new data structure for our monitoring different from the program stack. This stack is also transparent to the program and a part of the agent code that our scheme inserts.

When a violation happens, the control flow is about to introduce an invalid ID value to the ID variable due to an unexpected incoming edge in program analysis. We can recover the pre-violation path (M-A-C) in the following steps.

On violation:
  (1) Pop the last ID and the cs (the call site implies the function) from the stack
  (2) Resolve the call context using the last ID at the function where the cs belongs to.
  (3) The resolved path represents the partial path from the root to the last function before the violation.

For example, the last ID and the cs will be respectively point to the valid ID at C before C-K-Q-A call sequence happens. Therefore using these values, M-A-C path can be recovered correctly. The actual implementation is illustrated in FIG. 3 (B) as "CODE FOR RECOVERY OF A PRE_VIOLATION PATH".

Note that the execution of out-of-scope functions before the violation does not harm the stored information (e.g., ID variable) because the out of scope functions are not instrumented. For instance, in FIG. 1, when the function call sequence M-A-C-K-Q-A happens, the new call from C to A generates a control flow invariant violation. But since K and Q do not directly change the ID, it value remains valid.

3. Interpreting a Post-Violation Partial Path

After a violation happens, the application continues its execution and there could be potentially a long call path after the violation. Therefore we determined that this post path after the violation is also important and we provide a new mechanism to track and recover it correctly.

The key challenge here is that the new path after the violation is unexpected in the program analysis. Therefore the encoding ID from a pre-violation path is not valid in the following call path after violation in the control flow graph.

We have an observation that we can find a virtual context which becomes a prefix of the post path can hold the properties necessary for decoding. In particular, we found that with a virtual context with the ID value 0 the post path can be correctly decoded in precise calling context encoding. Therefore, when a violation occurs, we set the ID with 0 and store the node where the violation happens. The post path can be properly decoded using this information, the existing decoding algorithm, and the control flow graph information.

On violation:
  (1) Push the callee function of a violation
  (2) Reset the ID as 0

When a violation occurs, the current function is pushed to the stack. This function is the callee function of a violation and at the same time it becomes the starting caller function for the post-violation path. The implementation is illustrated in FIG. 3 (B) as "CODE FOR RECOVERY OF A POST-VIOLATION PATH".

During decoding:
  (1) Pop the callee function
  (2) Get the current function
  (3) Resolve the call context using the ID at the current function. As the decoding algorithm goes up the call graph, when it reaches the callee function, it stops.
  (4) The resolved path represents the partial path from the last violation to the current function.

When this post path is decoded, the callee function (the start of the post path) is popped. Using the current function, the CFG, and the decoding algorithm, the decoding is processed. As the algorithm goes up the call graph, when it reaches the callee function, it stops because that is the starting point that we introduced on the violation.

Note that the invention proposed is not dependent on a specific decoding scheme and therefore can be generally applied to multiple solutions. The decoding process and the decoding algorithm are specific to the call context encoding scheme. One example regarding the decoding process in a prior art can be found in [2].

From the foregoing, it can be appreciated that the present invention provides This invention can provide higher quality of monitored program status by detecting unexpected control flow and resolving unexpected partial paths. This scheme opens the opportunity to allow a monitor to track a part of a program of interest. Such flexible program scope can reduce the overhead of program monitoring.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention.

The invention claimed is:

1. A computer implemented method comprising the steps of:
    inserting code into a software system with logic to detect an execution of unexpected code and recovery of call paths when the execution happens by maintaining, in a software system, a program's calling context correct even when a monitoring of the program goes out of a scope of a program analysis by validating function call transitions and recovering partial paths before and after the violation of the program's control flow, the maintaining comprising:
    i) detecting a violation of control flow invariants in the software system including validating a source and destination of a function call in the software system and validating a function call on a caller side where an expected callee value is stored in a shared variable and the callee value is checked whether for matching the callee at an entry of the callee function;
    ii) preserving pre and post violation states;
    iii) interpreting a pre-violation partial path responsive to a failure of the validating; and
    iv) interpreting a post violation path after a violation of program flow; and
    when the code out of program analysis executes in an incident, detecting the incident by the code and recovering partial paths before and after the incident.

2. The method of claim 1, wherein the detecting includes detecting a moment when a program executes in a different way from the program analysis while determining the source and destination of each function call which is validated at runtime by inserting code into a program, the code detecting the moment by validating whether each function call complies with the pair information from the program analysis.

3. The method of claim 1, wherein interpreting a pre-violation path comprises failure of the validating including storing the program status to recover a last valid program call path before the violation, specifically, on detection of a violation, the last program status and the source of the call are stored.

4. The method of claim 1, wherein when a call path after a violation of program flow is an unexpected flow in a program analysis, the step of interpreting a post violation path includes recording and decoding the program status after the violation by introducing a virtual context in which there is a reset of the encoding ID of program context as 0 when a violation occurs and the following call path can be correctly decoded using the original decoding procedure because it complies with the properties of the original encoding scheme.

5. The method of claim 1, wherein steps i-iii) enable monitoring and addressing an inconsistency between a runtime program status and a program analysis result and detecting the incident that the runtime program status diverges from its analysis result at runtime and recovering and maintaining accurate program status.

6. The method of claim 1, wherein step i) comprises detecting unexpected program function calls and generating expected function call patterns and the being invariants of function calls triggering an action on violation.

7. The method of claim 1, wherein a basic mechanism to validate a function call is that in a caller side an expected callee value is stored in a shared variable and this value is checked whether it matches the callee at its entry of the callee function.

8. The method of claim 1, wherein for step i), responsive to one caller in a having multiple callees with respect to function calls, as the detection of the violation is performed by matching information in the caller and its callee, the code is inserted in respectively the caller and the callee.

9. The method of claim 1, wherein for step i), responsive to one caller in a having multiple callees with respect to function calls, using a thread local storage and in the callee, an expected callee identification is compared with the callee identification of a current function, which is statically determined when this callee side instrumentation code is generated, and if they are different, a violation of control flow invariant occurs.

10. The method of claim 1, wherein step ii) comprises, when a violation happens, recovery of the pre-violation path comprises popping the last identification and a call site that implies the function from the stack, resolve the call context using the last identification at the function where the call site belongs to with the resolved path representing the partial path from the root to the last function before the violation.

11. The method of claim 1, wherein step iii) comprises, when a violation happens, pushing a caller function of a violation.

12. A system for maintaining, in a software system, a program's calling context correct even when a monitoring of the program goes out of a scope of a program analysis by validating function call transitions and recovering partial paths before and after the violation of the program's control flow by inserting code into a software system with logic to detect an execution of unexpected code and recovery of call paths when the execution happens, the maintaining comprising:
    i) with a processor, detecting a violation of control flow invariants in the software system including validating a source and destination of a function call in the software system and validating a function call on a caller side where an expected callee value is stored in a shared variable and the callee value is checked whether for matching the callee at an entry of the callee function;
    ii) preserving pre and post violation states;
    iii) interpreting a pre-violation partial path responsive to a failure of the validating; and iv) interpreting a post violation path after a violation of program flow, and when the code out of program analysis executes in an incident, detecting the incident by the code and recovering partial paths before and after the incident.

13. The system of claim 12, wherein the detecting includes detecting a moment when a program executes in a different way from the program analysiswhile determining the source and destination of each function call which is validated at runtime by inserting code into a program, the code detecting the moment by validating whether each function call complies with the pair information from the program analysis.

14. The system of claim 12, wherein interpreting a pre-violation path comprises failure of the validating including storing the program status to recover a last valid program call path before the violation, specifically, on detection of a violation, the last program status and the source of the call are stored.

15. The system of claim 12, wherein when a call path after a violation of program flow is an unexpected flow in a program analysis, the step of interpreting a post violation path includes recording and decoding the program status after the violation by introducing a virtual context in which there is a reset of the encoding ID of program context as 0 when a violation occurs and the following call path can be correctly decoded using the original decoding procedure because it complies with the properties of the original encoding scheme.

16. The system of claim 12, wherein steps i-iii) enable monitoring and addressing an inconsistency between a runtime program status and a program analysis result and detecting the incident that the runtime program status diverges from its analysis result at runtime and recovering and maintaining accurate program status.

17. The system of claim 12, wherein for step i), responsive to one caller in a having multiple callees with respect to function calls, as the detection of the violation is performed by matching information in the caller and its callee, the code is inserted in respectively the caller and the callee.

18. The method of claim 12, wherein for step i), responsive to one caller in a having multiple callees with respect to function calls, using a thread local storage and in the callee, an expected callee identification is compared with the callee identification of a current function, which is statically determined when this callee side instrumentation code is generated, and if they are different, a violation of control flow invariant occurs.

19. The method of claim 1, wherein step ii) comprises, when a violation happens, recovery of the pre-violation path comprises popping the last identification and a call site that implies the function from the stack, resolve the call context using the last identification at the function where the call site belongs to with the resolved path representing the partial path from the root to the last function before the violation.

20. The method of claim 1, wherein step iii) comprises, when a violation happens, pushing a caller function of a violation.

* * * * *